United States Patent
Choi

(10) Patent No.: US 9,832,044 B2
(45) Date of Patent: Nov. 28, 2017

(54) APPARATUS FOR SETTING AN EMAIL SECURITY AND METHOD THEREOF

(75) Inventor: Mun Seok Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 1458 days.

(21) Appl. No.: 12/616,755

(22) Filed: Nov. 11, 2009

(65) Prior Publication Data

US 2011/0030063 A1 Feb. 3, 2011

(30) Foreign Application Priority Data

Jul. 29, 2009 (KR) .................. 10-2009-0069208

(51) Int. Cl.
*H04L 12/58* (2006.01)
*G06F 21/62* (2013.01)
*H04W 12/08* (2009.01)

(52) U.S. Cl.
CPC .......... *H04L 12/583* (2013.01); *G06F 21/629* (2013.01); *H04L 51/063* (2013.01); *H04W 12/08* (2013.01); *H04L 51/12* (2013.01); *H04L 51/14* (2013.01)

(58) Field of Classification Search
None
See application file for complete search history.

(56) References Cited

U.S. PATENT DOCUMENTS

| | | | | |
|---|---|---|---|---|
| 7,590,693 B1* | 9/2009 | Chan et al. | ................... | 709/206 |
| 7,849,213 B1* | 12/2010 | Borghetti | ................ | H04L 51/12 707/609 |
| 7,987,511 B2* | 7/2011 | Brown et al. | ................... | 726/27 |
| 8,091,138 B2* | 1/2012 | Yellepeddy et al. | ............ | 726/26 |
| 2003/0131057 A1 | 7/2003 | Basson et al. | | |
| 2005/0216745 A1 | 9/2005 | Speare et al. | | |
| 2006/0089970 A1* | 4/2006 | Pearson et al. | ............... | 709/206 |
| 2007/0060103 A1* | 3/2007 | Patterson et al. | ............ | 455/410 |
| 2007/0116281 A1 | 5/2007 | Brown et al. | | |
| 2007/0244977 A1* | 10/2007 | Atkins | ................ | G06Q 10/107 709/206 |
| 2008/0026723 A1* | 1/2008 | Han | ............................ | 455/410 |
| 2008/0289037 A1* | 11/2008 | Marman et al. | ................ | 726/22 |
| 2009/0019553 A1* | 1/2009 | Narayanaswami | ..... | H04L 63/10 726/28 |
| 2009/0254572 A1* | 10/2009 | Redlich et al. | ................. | 707/10 |

(Continued)

FOREIGN PATENT DOCUMENTS

| | | |
|---|---|---|
| EP | 0375138 | 6/1990 |
| EP | 1318645 | 6/2003 |
| JP | 2004-310637 | 11/2004 |

OTHER PUBLICATIONS

Apple Inc, iPhone in Business Microsoft Exchange, Jun. 2009, pp. 1-2.*

(Continued)

*Primary Examiner* — Nadia Khoshnoodi
(74) *Attorney, Agent, or Firm* — Lee, Hong, Degerman, Kang & Waimey

(57) ABSTRACT

An apparatus for setting an email security and method thereof are displayed. The present invention includes receiving an email from a email server, deleting partial information of the email according to a security level of the email, and displaying the partial information deleted email.

10 Claims, 4 Drawing Sheets

(56) References Cited

U.S. PATENT DOCUMENTS

2010/0015956 A1* 1/2010 Qu et al. .................. 455/414.1
2010/0332975 A1* 12/2010 Chang .................... H04L 51/12
                                                                                         715/256

OTHER PUBLICATIONS

Mah, Paul, The State of Push: A look at Microsoft's Push Mail, Oct. 3, 2007, pp. 1-2.*
International Business Machines (IBM), "Method to Preclude Unauthorized Sending or Forwarding of Mail Items," IBM Technical Disclosure Bulletin, vol. 37, No. 3, Mar. 1994, XP-000441437.
Landwehr, C., et al., "A Security Model for Military Message Systems," ACM Transactions on Computer Systems, vol. 2, No. 3, pp. 198-222, Aug. 1984, XP-009051533.

* cited by examiner

APPARATUS FOR SETTING AN EMAIL SECURITY AND METHOD THEREOF

CROSS-REFERENCE TO RELATED APPLICATIONS

Pursuant to 35 U.S.C. §119(a), this application claims the benefit of earlier filing date and right of priority to Korean Application No. 10-2009-0069208, filed on Jul. 29, 2009, the contents of which are hereby incorporated by reference herein in their entirety.

FIELD OF THE INVENTION

The present invention relates to an apparatus for setting an email security, and more particularly, to an apparatus for setting an email security and method thereof. Although the present invention is suitable for a wide scope of applications, it is particularly suitable for deleting information of an email in part according to a security level of the email.

DISCUSSION OF THE RELATED ART

Recently, the Internet use becomes a part of daily life and e-mail (electronic mail) transceiving via the Internet is generalized. In particular, a user accesses an email server via a communication terminal using an email account and is then able to send/receive an email to/from another user.

A recently appearing push email means an email system having an always-on function for a mail to immediately reach a mail client as soon as arriving at a mail server. In particular, the push email is the function for enabling a user to instantly check a mail that is directly received by a terminal like an arrival of SMS text. Hence, the push email has a concept relative to a pull email for a user to manually check a message by accessing a mail account through an intentional access to a program or webpage.

According to a related art, if an internal office mail is registered as a push email, a mobile terminal through an authentication procedure is able to receive every email inside an office or company. Thus, there is no filtering process for a security necessary mail that is supposed to be read inside the office only.

However, an internal office mail often causes such a problem as a leak of blueprint, which is confidential, and the like. According to the related art, all mails including a mail confidential outside an office are sent to a mobile terminal. In particular, if an internal office mail is registered as a push email, it may result in a problem of security.

SUMMARY OF THE INVENTION

Accordingly, the present invention is directed to an apparatus for setting an email security and method thereof that substantially obviate one or more problems due to limitations and disadvantages of the related art. As mentioned in the above description, a method for solving a security problem in case of registering an internal office mail as a push email.

An object of the present invention is to provide an apparatus for setting an email security and method thereof, by which a security problem can be solved in case of registering an internal office mail as a push email.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of setting an email security in a mobile terminal according to the present invention includes the steps of receiving an email from a email server, deleting partial information of the email according to a security level of the email, and displaying the partial information deleted email.

Preferably, in the step of deleting the partial information of the email, the partial information of the email is deleted in consideration of a reading authority level of the mobile terminal for indicating whether the mobile terminal is able to read the email to a prescribed extent and the security level of the email.

Preferably, the method further includes the step of setting a forward lock function in the email to prevent the email from being forwarded according to the security level of the email.

More preferably, in the forward lock function setting step, the forward lock function is set in the email to prevent the email from being forwarded to other email addresses except a specific email address.

Preferably, the method further includes the step of making a request for canceling the security level of the email to the email server.

In another aspect of the present invention, a method of setting an email security in an email server includes the steps of receiving an email from an email server, deleting partial information of the email according to a security level of the email, and sending the partial information deleted email to a mobile terminal.

Preferably, in the step of deleting the partial information of the email, the partial information of the email is deleted in consideration of a reading authority level of the mobile terminal for indicating whether the mobile terminal is able to read the email to a prescribed extent and the security level of the email.

In a further aspect of the present invention, a mobile terminal includes a wireless communication unit receiving an email from an email server, a control unit deleting partial information of the email according to a security level of the email, and a display unit displaying the partial information deleted email.

Preferably, the control unit deletes partial information of the email in consideration of a reading authority level of the mobile terminal for indicating whether the mobile terminal is able to read the email to a prescribed extent and the security level of the email.

Preferably, the control unit sets a forward lock function in the email to prevent the email from being forwarded according to the security level of the email.

More preferably, the control unit sets the forward lock function in the email to prevent the email from being forwarded to other email addresses except a specific email address.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF PREFERRED EMBODIMENTS

Reference will now be made in detail to the preferred embodiments of the present invention, examples of which are illustrated in the accompanying drawings, to facilitate those having ordinary skill in the art to implement the invention. The present invention can be implemented in various forms, which is non-limited by the following embodiments. To clearly describe the present invention, parts irrespective of the description are omitted from the drawings. Wherever possible, the same reference numbers will be used throughout the drawings to refer to the same or like parts.

Throughout this disclosure, if a prescribed part 'includes' a prescribed element, it means that another element can be further included instead of eliminating other elements as long as absence of special objection. Moreover, such a terminology as '~ part' '~ functionality', '~ module' and the like means a unit for handling at least one function or operation, which can be implemented by software, hardware or combination thereof.

In the following description, suffixes 'module', and 'part' for elements are given to facilitate the preparation of this disclosure only. So, significant meanings or roles are not given to the suffixes themselves. Hence, it is understood that the 'module' and 'part' can be interchangeably used.

A mobile terminal in this specification can include a mobile phone, a smart phone, a notebook computer (laptop computer), a digital broadcast terminal, a PDA (personal digital assistants), a PMP (portable multimedia player), a navigation system or the like.

And, it is apparent to those skilled in the art that the configuration according to an embodiment disclosed in this specification should be applicable to such a fixed or stationary terminal as a digital TV, a desktop computer and the like except a case applicable to a mobile terminal only.

In a method of setting an email security according to the present invention, once a user sets a security level in writing an email via a PC (personal computer) client within an office, a mobile terminal receives the security level set email via a push email server. Subsequently, the mobile terminal filters the email according to the security level and then shows information to the user in part. According to an embodiment of the present invention, filtering means a process for deleting a partial content of an email according to a security level of the email. For instance, an email, of which security level is set not to be displayed on a mobile terminal, is deleted. A text, attached file and the like of an email, of which security level is set to display a title on a mobile terminal only, are deleted.

In the following description, an email system according to an embodiment of the present invention is explained with reference to FIG. 1.

Figure 1:
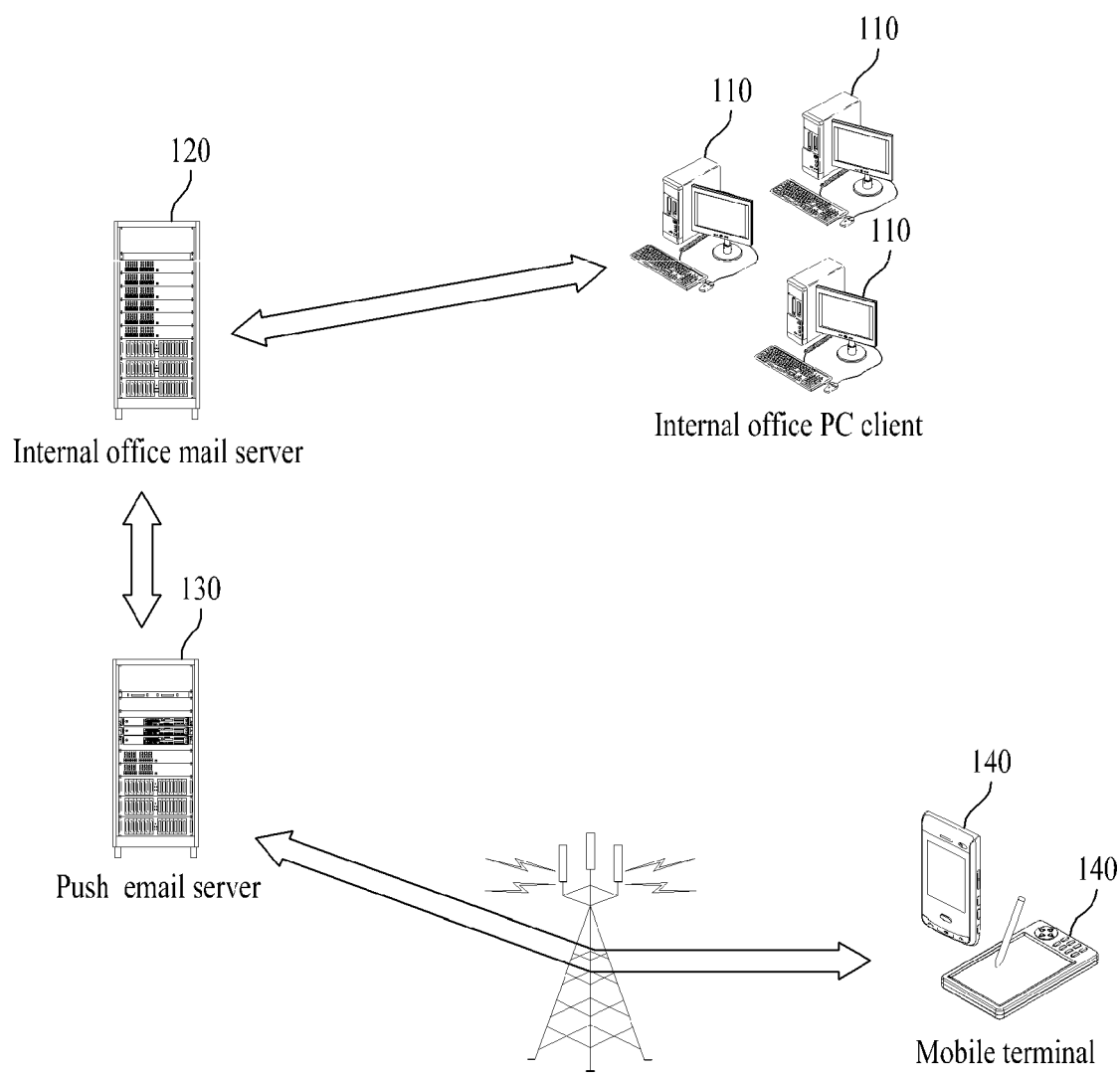
FIG. 1 is a diagram for configuration of an email system according to an embodiment of the present invention.

FIG. 1 is a diagram for configuration of an email system according to an embodiment of the present invention.

Referring to FIG. 1, an email system according to an embodiment of the present invention includes a PC client 110 in an office, an internal office mail server 120, a push email server 130 and a mobile terminal 140.

A user writes and sends an email via the PC client 110 in the office or is able to receive an email via the PC client 110 in the office. When a user writes an email via the PC client 110 in the office, the user is able to set a security level of the email. If the security level set email is sent to the mobile terminal 140 via the push email sever 130, the mobile terminal 140 displays partial information by filtering the email in consideration of the security level or is able to put limitation on a user who is attempting to forward the security level set email.

If the internal office mail server 120 receives the email from the PC client in the office, the internal office mail server 120 sends the email to the PC client 110 of a recipient and the PC client 110 of a co-recipient. The internal office mail sever 120 sends the email to the push email sever 130 as well. In this case, if a security level is set for the email, it is able to transfer partial information of the email to the push email server only by filtering the email in consideration of the security level. For instance, the internal office mail server 120 transmits a title of the email to the push email server 13 according to the security level of the email only, sends a title and text of the mail to the push email server 130 by deleting an attached file, or transmits a title, text and attached file of the mail to the push mail server 130 by deleting a co-recipient.

The push email server 130 sends the email, which was received from the internal office mail server 120, to the mobile terminal 140.

If the internal office mail server 120 sends the email to the push email server 130 without filtering the email, the push email server 130 filters the email according to the security level and then sends the filtered email to the mobile terminal 140. In doing so, the push email server 130 is able to filter the email in consideration of the security level of the email and a reading authority level of the mobile terminal 140. When the email is filtered, if the reading authority level of the mobile terminal 140 is taken into consideration, a specific mobile terminal is granted to read the email even if the security level is set for the email.

For instance, if a reading authority level is set to enable a boss's mobile terminal to read all mails, the push email server 130 does not filter a security level set email but is able to transmit all contents of the security level set email to the boss's mobile terminal.

The mobile terminal 140 receives the email from the push email server 130 and then displays the received email. If the email is not filtered by the internal office mail server 120 or the push email server 130, the mobile terminal 140 is able to filter the received email according to the security level and is then able to display the received email. In doing so, the mobile terminal 140 is able to filter the email in consideration of the security level of the email and the reading authority level of the mobile terminal 140. The mobile terminal 140 filters the email by the same method for the push email server 130 to filter the email. And, the mobile terminal 140 is able to prevent the security level set email from being forwarded.

Figure 2:
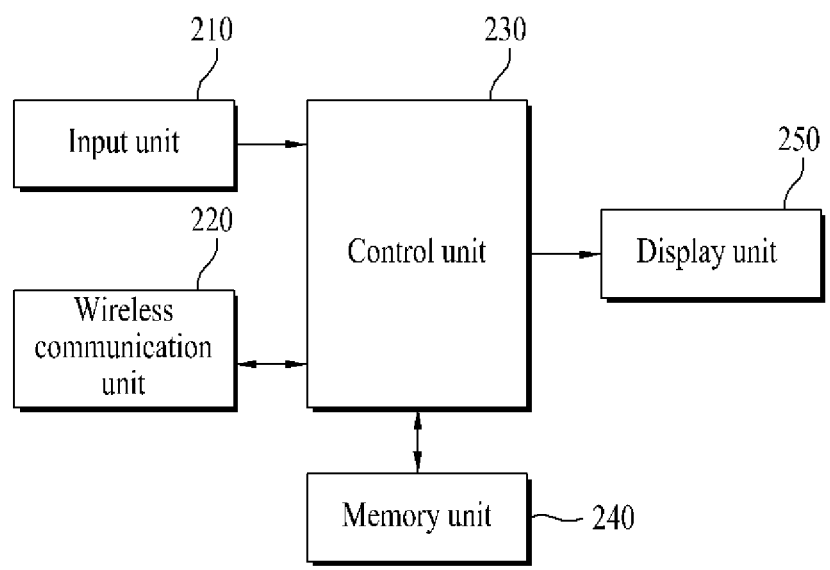
FIG. 2 is a block diagram of a terminal according to an embodiment of the present invention.

In the following description, a terminal according to an embodiment of the present is explained with reference to FIG. 2. FIG. 2 is a block diagram of a terminal according to an embodiment of the present invention.

Referring to FIG. 2, a terminal according to an embodiment of the present invention includes an input unit 210, a wireless communication unit 220, a control unit 230, a memory unit 240 and a display unit 250.

The input unit 210 generally receives various inputs from a user and then delivers an input value to the control unit 230. The input value received from the user enables one of various functions of a mobile terminal to be executed or plays a role as a parameter of this function. The input unit 210 can include a keypad, a dome switch, a touchpad (static pressure/electrostatic), a jog wheel, a jog switch and/or the like.

The wireless communication unit 220 performs a function of transceiving data and audio information with peripheral devices in various ways including wire and wireless under the control of the control unit 230. In particular, the wireless communication unit 220 performs a function of transmitting and receiving various commands, data and audio information between a terminal and a push email server. Namely, the wireless communication module 220 performs a function of downloading an email header and a whole email from the push email server.

The control unit 230 performs overall functions of the mobile terminal. For instance, the control unit 230 performs controls and processing related to a speech call, a data communication, a video call and the like.

In particular, if the mobile terminal receives an email that is not filtered by an internal office mail server or a push email server, the control unit 230 filters the received email according to a security level. In this case, the control unit 230 is able to filter the email in consideration of the security level of the email and a reading authority level of the mobile terminal.

The memory unit 240 is able to store programs for processing and control of the control unit 230. The memory unit 240 is able to perform a function for the temporary storage of inputted/outputted data (e.g., phonebook, message, audio, still picture, moving picture, etc.). The memory unit 240 is able to store a use frequency of each of the inputted/outputted data together with the inputted/outputted data.

The memory unit 240 is able to include a storage medium of at least one type of a flash memory, a hard disk, a multimedia card micro type memory, a card type memory (e.g., SD memory, XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disk, and an optical disk.

The display unit 250 performs a function of outputting information processed by the mobile terminal and a function of providing visual information to a user in the course of such a mutual reaction with the user as an input process, an output process and the like. For instance, in case that the mobile terminal is in a call mode, the display unit 250 displays a user interface (UI) or a graphic user interface (GUI) related to a call. If the mobile terminal is in a video call mode or a photographing mode, the display unit 250 displays a photographed and/or received image, a user interface (UI) or a graphic user interface (GUI). In case that an email is received from a push email server, the display unit 250 displays an email. If a security level is set for the email, the display unit 250 outputs information of the email filtered according to the security level.

The display unit 250 is able to include at least one of a liquid crystal display (LCD), a thin film transistor liquid crystal display (TFT LCD), an organic light-emitting diode (OLED), a flexible display and a 3D display.

In the following description, a method of setting an email security according to an embodiment of the present invention is explained. In the following description, a method of setting an email security according to a first embodiment of the present invention is explained in case that a mobile terminal filters an email. In the following description, a method of setting an email security according to a second embodiment of the present invention is explained in case that a push email server filters an email.

First of all, a method of setting an email security according to a first embodiment of the present invention is explained with reference to FIG. 3 and FIG. 4 as follows.

Figure 3:
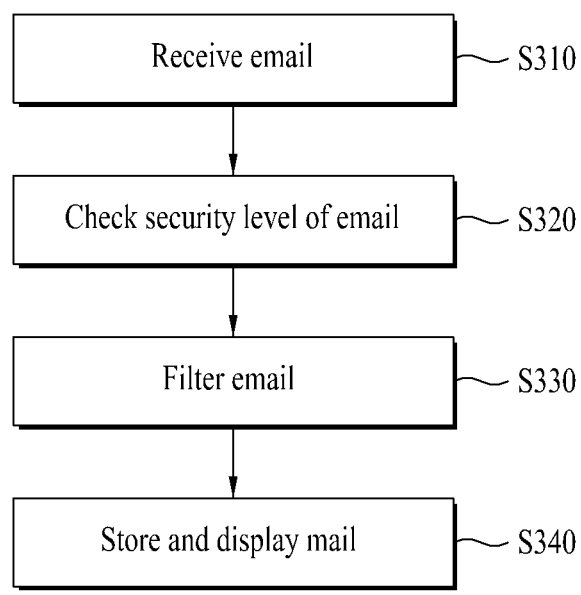
FIG. 3 is a flowchart for a method of setting an email security according to a first embodiment of the present invention in case that a mobile terminal filters an email in consideration of a security level of the email.
Figure 4:
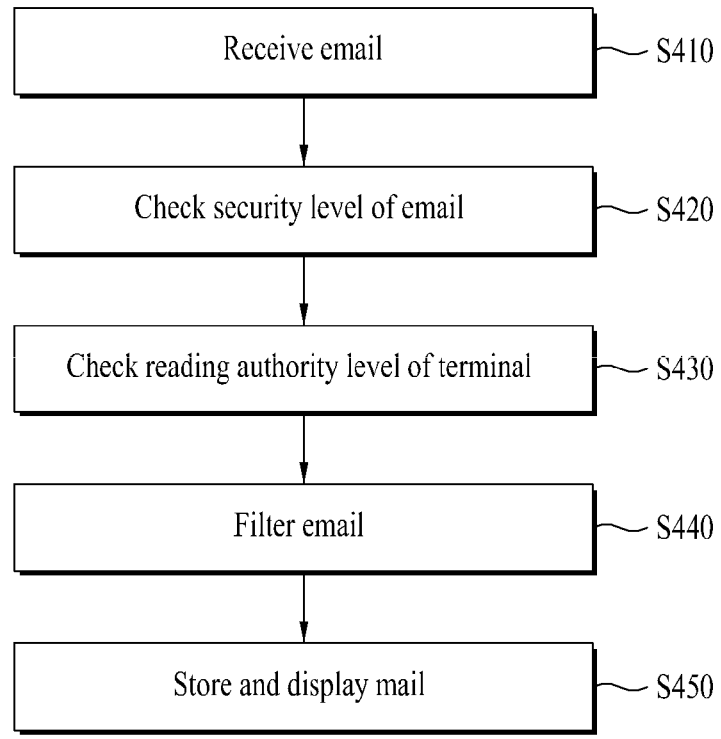
FIG. 4 is a flowchart for a method of setting an email security according to a first embodiment of the present invention in case that a mobile terminal filters an email in consideration of a security level of the email and a reading authority level of the mobile terminal.

FIG. 3 is a flowchart for a method of setting an email security according to a first embodiment of the present invention in case that a mobile terminal filters an email in consideration of a security level of the email, and FIG. 4 is a flowchart for a method of setting an email security according to a first embodiment of the present invention in case that a mobile terminal filters an email in consideration of a security level of the email and a reading authority level of the mobile terminal.

Referring to FIG. 3, if a mobile terminal receives an email [S310], the mobile terminal checks a security level of the email [S320] and then filters the email according to the checked security level [S330].

The security level of the email can be set when an email writer writes the email. And, this security level determines whether the mobile terminal received the email via a push email server is able to display prescribed information of the email.

For instance, assuming that a security level is classified into four steps including a first step having a highest security level and a fourth step having a lowest security level, it is able to determine the security level in the following manner. First of all, a mail having the security level set to the first step should not be displayed by the mobile terminal having received the email via the push email server. Secondly, a title of a mail having the security level set to the second step can be just displayed by the mobile terminal having received the email via the push email server. Thirdly, a title and text of a mail having the security level set to the third step can be displayed by the mobile terminal having received the email via the push email server in a manner that the mobile terminal deletes an attached file. Fourthly, a title, text and attached file of a mail having the security level set to the fourth step can be displayed by the mobile terminal having received the email via the push email server in a manner that the mobile terminal deletes a co-recipient.

In case that the security level is determined as the above-described four steps, if the mobile terminal receives an email having the security level set to the first step, the mobile terminal deletes the email. If the mobile terminal receives an email having the security level set to the second step, the control unit of the mobile terminal deletes a text, attached file and co-recipient of the email and is able to transfer a title of the email to the memory unit and the display unit only.

Subsequently, the mobile terminal stores and displays the email filtered according to the security level [S340]. In particular, the memory unit of the mobile terminal stores the filtered email received from the control unit, while the display unit of the mobile terminal displays the filtered email received from the control unit.

Referring to FIG. 4, if a mobile terminal receives an email [S410], the mobile terminal checks a security level of the email [S420] and also checks a reading authority level of the mobile terminal [S430].

In this case, the reading authority level of the mobile terminal indicates an approval for a prescribed mobile terminal to read a prescribed extent of the email. The reading authority level of the mobile terminal is stored in the corresponding mobile terminal or can be stored in a database of a push email server.

For instance, assuming that a reading authority level is classified into 3 steps, if a first step indicates a highest step of the reading authority and a third step indicates a lowest step of the reading authority, a mobile terminal having the reading authority level set to the first step is able to display all information of an email having the security level set thereto. A mobile terminal having the reading authority level set to the second step is able to display a title and text of an email having the security level set thereto. And, a mobile terminal having the reading authority level set to the third step is able to display a title of an email having a security level set thereto only.

The mobile terminal filters the email in consideration of the security level of the email and a reading authority level of the mobile terminal [S440] and then stores and displays the filtered email [S450].

Like the above-mentioned example, assuming that a security level of an email is set to 4steps and a reading authority level of a mobile terminal is set to 3 steps, if the reading authority level of the mobile terminal is set to a first step, the mobile terminal is able to display all information of the email irrespective of the security level of the email.

If a reading authority level of a mobile terminal is set to a second step, although a security level of an email is set to a first or second step, the mobile terminal is able to display a title and text of the email. If a reading authority level of a mobile terminal is set to a third step, although a security level of an email is set to a first step, the mobile terminal is able to display a title of the email.

The mobile terminal is able to set a forward lock function of preventing a user from forwarding an email for which a security level is set. In this case, the mobile terminal is able to set a forward lock for every email having a security level set thereto or an email having a specific security level or higher set thereto.

The mobile terminal is able to set a security level set email not to be forward to all recipients. Alternatively, the mobile terminal is able to set a security level set email not to be forward to all recipients except a specific mail address. For instance, it is able to set an email to be forwarded to an office or company mail address by avoiding being forwarded to other mail addresses.

It is able to differentiate a forwarding lock setting according to a reading authority level for each mobile terminal. For instance, if a reading authority level is set to a first step, it is able to set an email to be forwarded to all mail addresses. If a reading authority level is set to a second step, it is able to set an email to be forwarded to an office mail address only.

Moreover, the mobile terminal is able to make a request for a cancellation of the security level to the push email server. If the push email server makes the security level cancellation to an internal office mail server, the internal office mail server checks whether the security level can be cancelled. If the security level can be cancelled, the internal office mail server is able to allow the cancellation. The mobile terminal is then able to display the security level canceled email.

In the following description, a method of setting an email security according to a second embodiment of the present invention is explained with reference to FIG. 5.

Figure 5:
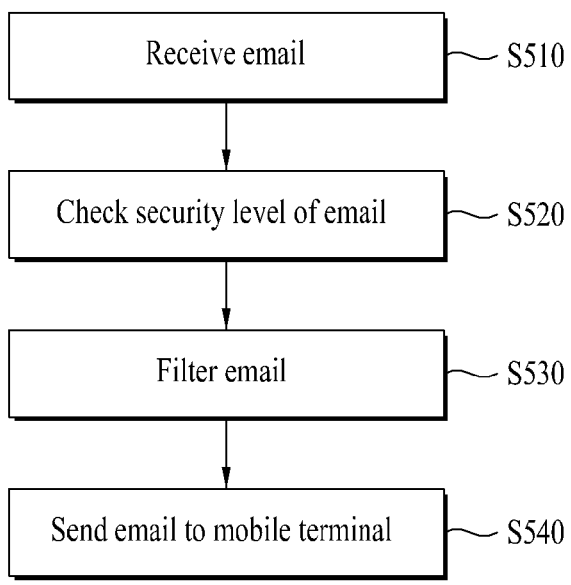
FIG. 5 is a flowchart for a method of setting an email security according to a second embodiment of the present invention.

FIG. 5 is a flowchart for a method of setting an email security according to a second embodiment of the present invention.

Referring to FIG. 5, if a push email server receives an email from a mail server [S510], the push email server checks a security level of the email [S520] and then filters the email according to the checked security level [S530]. In doing so, the push email server is able to filter the email in consideration of a reading authority level of a mobile terminal and the security level of the email.

A process for the push email server to filter the email is equal to the former process for the mobile terminal to filter the email, which is explained in the foregoing description of the first embodiment.

Subsequently, the push email server sends the filtered email to the mobile terminal [S540].

Embodiments of the present invention can be implemented using various means. For instance, embodiments of the present invention can be implemented using hardware, firmware, software and/or any combinations thereof. In the implementation by hardware, an email security setting method according to one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, an email security setting method according to one embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means well-known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

And, it is apparent that claims not in the explicitly cited relation can be combined to configure a new embodiment or can be included as new claims by correction after application.

Accordingly, the present invention provides the following effects and/or advantages. First of all, the present invention deletes information of an email in part according to a security level of the email, thereby solving a security problem in case of registering an internal office mail as a push email.

Effects obtainable from the present invention are non-limited by the above-mentioned effects. And, it will be apparent to those skilled in the art that other unmentioned effects are clearly understandable from the following description.

What is claimed is:

1. A method for filtering an email in a mobile terminal, the method comprising:
   setting a reading authority level in the mobile terminal, the reading authority level set to one of a plurality of reading authority levels, each of the plurality of reading authority levels indicating a different extent of the email that is displayable at the mobile terminal;
   receiving the email pushed from a push mail server, the email including a security level set, at an external terminal, to one of a plurality of security levels, each of the plurality of security levels indicating a different extent of the email that is displayable at the mobile terminal;
   checking the security level and the reading authority level in response to the received email, wherein the reading authority level has a higher priority than the security level such that any emails set with a security level are displayable at the mobile terminal when the reading authority level is set to a highest reading authority level;
   displaying the received email based on the security level and the reading authority level by:
      displaying all information of the email including a title, text, an attached file, and co-recipient information irrespective of the security level when the reading authority level is set to a first of the plurality of reading authority levels and when the security level is set to a first or highest security level that does not allow displaying of any information of the email or set to a second security level that does not allow displaying of the text, the attached file, and the co-recipient information;
      displaying the title and the text of the email by filtering the email if the reading authority level is set to a second of the plurality of reading authority levels even if the security level of the email is set to the first or second security level that does not allow displaying of the text of the email; and
      displaying the title of the email by filtering the email if the reading authority level is set to a third of the plurality of reading authority levels even if the security level of the email is set to the first security level that does not allow displaying of the title of the email;
   selectively deleting at least the title, the text, the attached file, or the co-recipient information of the received email set to the first security level such that the email is selectively displayable at the mobile terminal when the reading authority level is set to the second or third of the plurality of reading authority levels, wherein none of the title, the text, the attached file, and the co-recipient information of the received email that is set to the first security level is deleted when the reading authority level is set to the highest reading authority level; and
   setting a forward lock function to prevent forwarding of an email for which a security level is set such that the received email including the set security level cannot be forwarded to another email address unless the reading authority level is set to the highest reading authority level.

2. The method of claim 1, further comprising requesting the push mail server to cancel the security level of the email.

3. The method of claim 2, further comprising:
   displaying the email of which the security level was cancelled.

4. The method of claim 1, wherein the forward lock function is selectively settable for either every email having any security level set thereto or every email having a specific security level set thereto.

5. The method of claim 4, wherein the forward lock function is selectively settable to allow forwarding of the email, for which the security level is set, to an internal email address sharing a same domain name.

6. A mobile terminal, comprising:
   a wireless communication unit configured to receive an email pushed from a push mail server, the email including a security level set, at an external terminal, to one of a plurality of security levels, each of the plurality of security levels indicating a different extent of the email that is displayable;
   a display configured to display the received email;
   a memory unit configured to store a reading authority level set at the mobile terminal, the reading authority level set to one of a plurality of reading authority levels, each of the plurality of reading authority levels indicating a different extent of the email that is displayable; and
   a control unit configured to:
      check the security level and the reading authority level in response to the received email, wherein the reading authority level has a higher priority than the security level such that any emails set with a security level are displayable at the mobile terminal when the reading authority level is set to a highest reading authority level;
      cause the display to display the received email based on the security level and the reading authority level by:
         causing the display to display all information of the email including a title, text, an attached file, and co-recipient information irrespective of the security level when the reading authority level is set to a first of the plurality of reading authority levels and when the security level is set to a first or highest security level that does not allow displaying of any information of the email or set to a second security level that does not allow displaying of the text, the attached file, and the co-recipient information;
         causing the display to display the title and the text of the email by filtering the email if the reading authority level is set to a second of the plurality of reading authority levels even if the security level of the email is set to the first or second security level that does not allow displaying of the text of the email; and
         causing the display to display the title of the email by filtering the email if the reading authority level is set to a third of the plurality of reading authority levels even if the security level of the email is set to the first security level that does not allow displaying of the title of the email;
      selectively delete at least the title, the text, the attached file, or the co-recipient information of the received email set to the first security level such that the email is selectively displayable at the mobile terminal when the reading authority level is set to the second or third of the plurality of reading authority levels, wherein none of the title, the text, the attached file, and the co-recipient information of the received email that is set to the first security level is deleted when the reading authority level is set to the highest reading authority level; and set a forward lock function to prevent forwarding of an email for which a security level is set such that the received email including the set security level cannot be forwarded to another email address unless the reading authority level is set to the highest reading authority level.

7. The mobile terminal of claim 6, wherein the control unit is further configured to request the push mail server to cancel the security level of the email.

8. The mobile terminal of claim 7, wherein the control unit is further configured to cause the display to display the email of which the security level was cancelled.

9. The mobile terminal of claim 6, wherein the forward lock function is selectively settable for either every email having any security level set thereto or every email having a specific security level set thereto.

10. The mobile terminal of claim 9, wherein the forward lock function is selectively settable to allow forwarding of the email, for which the security level is set, to an internal email address sharing a same domain name.

* * * * *